Patented May 10, 1927.

1,628,035

UNITED STATES PATENT OFFICE.

FRANK EARL DENNY, OF YONKERS, NEW YORK, ASSIGNOR TO BOYCE THOMPSON INSTITUTE FOR PLANT RESEARCH, INC., OF YONKERS, NEW YORK, A CORPORATION OF NEW YORK.

PROCESS OF SPROUTING BUDS AND PLANTS.

No Drawing.   Application filed July 14, 1926. Serial No. 122,506.

At the end of a growth period or cycle, many plants form resting buds, that is, growing tips or more or less well developed growth primordia which stop growing and become dormant. They remain alive but cease active extension or elongation. These buds consist of plant cells or groups of cells that, after a period of rest and under certain conditions, can resume growth and either form additional tissue or new branches on the old plant or if detached become the active growing points from which new plants are produced.

In the case of many plants after these buds once become dormant a rest period must ensue before they will renew growth even under favorable conditions. Great losses have been sustained by persons engaged in the business of raising such plants because of the delay in sprouting.

There is an urgent need of a method of breaking this rest period and causing prompt sprouting of dormant buds. With certain species of plants two or more crops per year could thus be raised on the same plot of ground and in other cases a new crop could be placed on the market earlier than is now possible, thus obtaining the advantage of the most favorable marketing conditions. More prompt sprouting would also permit the controlling of certain plant diseases by the use of dormant buds from disease-free localities.

My investigations have led to the discovery of a method of shortening this rest period and causing prompt germination or sprouting of dormant buds.

I have found that by pre-treating dormant buds or seeds with a halogen substitution product of ethylene, and particularly with ethylene chlorhydrin, the rest period may be materially reduced and the bud or seed caused to sprout within a relatively short time. The particular method of bringing the bud or seed into contact with the chemical is unimportant and forms no part of the invention. As an illustration, ethylene chlorhydrin may be used in the treatment of potatoes and the potatoes to be treated may be immersed in a solution of this matter of proper strength for the desired length of time.

Freshly harvested potatoes if replanted under conditions favorable for growth do not sprout at once. The period of dormancy varies with the variety but is generally two months or more. Since the price received for the product is related to earliness of marketing, the financial gain that could be obtained by the elimination of this period of dormancy would be considerable. If the potatoes to be planted are brought into contact with ethylene chlorhydrin or tri-chloroethylene this period of dormancy can be practically eliminated. Various methods may be employed for bringing the potatoes into contact with the chemical. The potatoes either intact or cut into pieces of the proper size for planting may be soaked in a solution of 3 to 12 c. c. of ethylene chlorhydrin per liter of water. In the case of cut tubers the contact is maintained for one and two hours and in the case of whole tubers for 16 to 24 hours. A stronger solution may be employed by adding 10 to 50 c. c. of ethylene chlorhydrin to 1,000 c. c. of water and the cut or whole tubers dipped into this solution and then placed in a closed container for 16 to 48 hours.

The cut or whole tubers may be submitted to vapors of ethylene chlorhydrin by placing them in a closed container and introducing vapors equivalent to form one to six c. c. of ethylene chlorhydrin for each liter of air space in the container. The contact should be maintained for 16 to 48 hours. The ethylene chlorhydrin used for these treatments is a commercial product known to the chemical trade as "ethylene chlorhydrin–40%".

I may also employ tri-chloroethylene using the vapor process and placing the whole or cut tubers in a closed container where they are exposed for a period of 16 to 48 hours to the vapors. In this method I employ from one to 10 c. c. of tri-chloroethylene for each 10 to 50 liters of air space.

Potatoes treated by either of the methods set forth above sprout in six to ten days and shoots appear above the ground in 25 to 35 days. In comparison untreated potatoes sprout in 30 to 60 days and appear above the ground in 60 to 90 days. The particular concentrations and lengths of time of treatment are not essential features of the invention. The amounts and periods of applications can be and should be varied to suit the requirements of the individual species or varieties of plants and more particularly the stage of dormancy. The particular methods of contacting the potatoes or other plants with the chemicals are merely illustrative and the invention is in no way restricted to these examples. The essential feature of the invention is to contact dormant plants or buds with the chemicals for the purpose of overcoming this natural period of dormancy.

Likewise, although the examples described above relate to the treatment of potatoes, the invention is not so limited. The fundamental causes of this period of dormancy of buds are similar in other species of plants as is well known to the agriculturist and similar results may be obtained with other plants by the same or somewhat modified methods of treatment. Throughout the specification and claims the word "bud" is used in its broad sense and includes bulbs, tubers, cormels, and other forms of stem-producing structures.

I claim:

1. The method of treating buds prior to planting which consists in contacting them with a halogen derivative of ethylene.

2. The method of treating buds prior to planting which consists in contacting them with ethylene chlorhydrin.

3. The method of treating potatoes prior to planting which consists in contacting them with a halogen derivative of ethylene.

4. The method of treating potatoes prior to planting which consists in contacting them with ethylene chlorhydrin.

5. The method of treating buds prior to planting which consists in immersing them in a solution of a halogen derivative of ethylene.

6. The method of treating buds or seeds prior to planting which consists in immersing them in a solution of ethylene chlorhydrin.

7. The method of treating potatoes prior to planting which consists in immersing them in a solution of ethylene chlorhydrin.

8. The method of treating potatoes prior to planting which consists in immersing them in a solution of ethylene chlorhydrin containing from 3 to 12 c. c. of ethylene chlorhydrin per liter of water.

In testimony whereof I affix my signature.

FRANK EARL DENNY.